(12) United States Patent
Menon et al.

(10) Patent No.: US 12,166,997 B2
(45) Date of Patent: Dec. 10, 2024

(54) PERCEPTUALLY-AWARE ONLINE PER-TITLE ENCODING FOR LIVE VIDEO STREAMING

(71) Applicant: Bitmovin GmbH, Klagenfurt am Wörthersee (AT)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: BITMOVIN, GMBH, Klagenfurt am Wörthersee (AT)

( * ) Notice: Subject to any disclaimer, the term of this patent is extended or adjusted under 35 U.S.C. 154(b) by 41 days.

(21) Appl. No.: 18/140,015

(22) Filed: Apr. 27, 2023

(65) Prior Publication Data

US 2023/0388511 A1     Nov. 30, 2023

Related U.S. Application Data

(60) Provisional application No. 63/336,136, filed on Apr. 28, 2022.

(51) Int. Cl.
*H04N 19/136*     (2014.01)
*H04N 19/105*     (2014.01)
(Continued)

(52) U.S. Cl.
CPC ......... *H04N 19/136* (2014.11); *H04N 19/105* (2014.11); *H04N 19/12* (2014.11);
(Continued)

(58) Field of Classification Search
CPC .... H04N 19/136; H04N 19/105; H04N 19/12; H04N 19/154; H04N 19/184;
(Continued)

(56) References Cited

U.S. PATENT DOCUMENTS 10,104,413 B2   10/2018   Phillips et al.
10,499,081 B1   12/2019   Wang et al.
(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.
(Continued)

*Primary Examiner* — Jae N Noh
(74) *Attorney, Agent, or Firm* — Marton Ribera Schumann & Chang LLP; Chien-Ju Alice Chuang; Hector J. Ribera

(57) ABSTRACT

Techniques for implementing perceptually aware per-title encoding may include receiving an input video, a set of resolutions, a maximum target bitrate and a minimum target bitrate, extracting content aware features for each segment of the input video, predicting a perceptually aware bitrate-resolution pair for each segment using a model configured to optimize for a quality metric using constants trained for each of the set of resolutions, generating a target encoding set including a set of perceptually aware bitrate-resolution pairs, and encoding the target encoding set. The content aware features may include a spatial energy feature and an average temporal energy. According to these methods only a subset of bitrates and resolutions, less than a full set of bitrates and resolutions, are encoded to provide high quality video content for streaming.

14 Claims, 5 Drawing Sheets

(51) Int. Cl.
*H04N 19/12* (2014.01)
*H04N 19/154* (2014.01)
*H04N 19/184* (2014.01)
*H04N 19/30* (2014.01)
*H04N 19/42* (2014.01)
*H04N 19/61* (2014.01)
*H04N 19/625* (2014.01)
*H04N 21/2187* (2011.01)

(52) U.S. Cl.
CPC ......... *H04N 19/154* (2014.11); *H04N 19/184* (2014.11); *H04N 19/30* (2014.11); *H04N 19/42* (2014.11); *H04N 19/61* (2014.11); *H04N 19/625* (2014.11); *H04N 21/2187* (2013.01)

(58) Field of Classification Search
CPC ........ H04N 19/30; H04N 19/42; H04N 19/61; H04N 19/625; H04N 21/2187
See application file for complete search history.

(56) References Cited

U.S. PATENT DOCUMENTS

| | | |
|---|---|---|
| 2010/0189183 A1 | 7/2010 | Gu et al. |
| 2011/0305273 A1 | 12/2011 | He et al. |
| 2012/0147958 A1 | 6/2012 | Ronca |
| 2013/0089142 A1 | 4/2013 | Begen et al. |
| 2013/0282917 A1 | 10/2013 | Reznik et al. |
| 2016/0073106 A1 | 3/2016 | Su |
| 2016/0134881 A1 | 5/2016 | Wang |
| 2017/0078686 A1 | 3/2017 | Coward et al. |
| 2018/0014050 A1 | 1/2018 | Phillips et al. |
| 2018/0338146 A1 | 11/2018 | John |
| 2019/0028745 A1 | 1/2019 | Katsavounidis |
| 2019/0075301 A1 | 3/2019 | Chou et al. |
| 2020/0412784 A1 | 12/2020 | Yamagishi et al. |

OTHER PUBLICATIONS

Jain et al., "Throughput Fairness Index: An Explaination", 1984, pp. -13.

Mehrabi et al., "Edge Computing Assisted Adaptive Mobile Video Streaming", IEE Transactions on Mobile Computing, vol. 18, No. 4, Apr. 2019, pp. 787-800.

Lederer et al., "Dynamic Adaptive Streaming over HTTP Dataset", Proceedings of the 3rd Multimedia Systems Conference, Feb. 2012, pp. 89-94.

Ericsson, "Ericsson Mobility Report", Nov. 2019, pp. 1-36.

ETSI, "Mobile Edge Computing A Key Technology Towards 5G", ETSI White Paper No. 11, Sep. 2015, pp. 1-16.

Nguyen et al., "Adaptation Method for Video Streaming over HTTP/2", IEICE Communications Express Comex, vol. 1, pp. 1-6, https://www.researchgate.netpublication/292213198_Adaptation_Method_for_Video_Streaming_over_HTTP2).

3GPP "3GPP TS 26.247. Progressive Download and Dynamic Adaptive Streaming over HTTP (3GP-DASH)", 2015, pp. 1, https://portal.3gpp.org/desktopmodules/Specifications/SpecificationDetails.aspx?specificationId=1444.

Gernot Zwantschko, "What is Per-Title Encoding? How to Efficiently Compress Video", Bitmovin, pp. 1-14, https://bitmovin.com/per-title-encoding/.

V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.

Liu et al., "Video Super-Resolution Based on Deep Learning: A Comprehensive Survey", arXiv:2007.12928v3 [cs.CV], Mar. 16, 2022, pp. 1-33.

Jon Dahl, "Instant Per-Title Encoding", MUX, Apr. 17, 2018, pp. 1-8, https://mux.com/blog/instant-per-title-encoding/.

Ledig et al., "Photo-Realistic Single Image Super-Resolution Using a Generative Adversarial Network", arXiv:1609.04802, May 25, 2017, pp. 1-19, http://arxiv.org/abs/1609.04802.

Mishra et al., "A Survey on Deep Neural Network Compression: Challenges, Overview, and Solutions", arXiv:2010.03954, Oct. 5, 2020, pp. 1-19, https://arxiv.org/abs/2010.03954.

Li et al., "Toward A Practical Perceptual Video Quality Metric", Netflix Technology Blog, Jun. 5, 2016, pp. 1-23, https://netflixtechblog.com/toward-a-practical-perceptual-video-quality-metric-653f208b9652.

Menon et al., "ETPS: Efficient Two-pass Encoding Scheme for Adaptive Live Streaming," Athena, https://www.youtube.com/watch?v=-pb3VJtrBN4, Oct. 16-19, 2022, pp. 1-2.

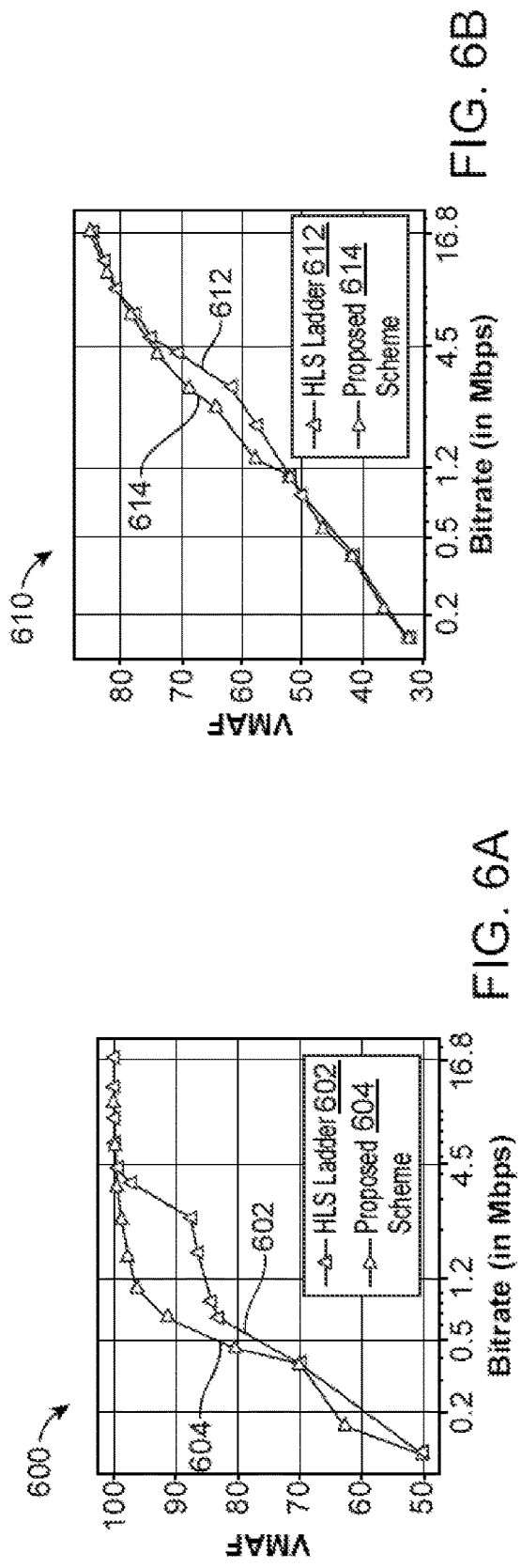
FIG. 6A
FIG. 6B
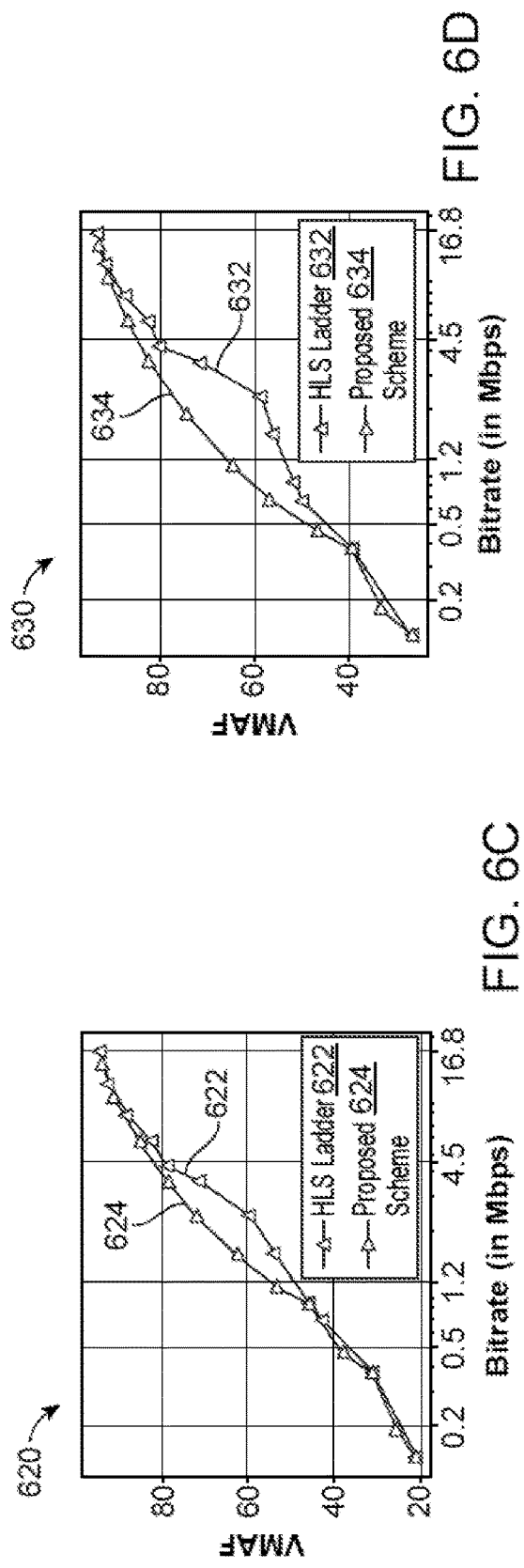
FIG. 6C
FIG. 6D

PERCEPTUALLY-AWARE ONLINE PER-TITLE ENCODING FOR LIVE VIDEO STREAMING

CROSS-REFERENCE TO RELATED APPLICATIONS

This application claims priority to U.S. Patent Application No. 63/336,136 entitled "Perceptually-aware Online Per-title Encoding for Live Video Streaming," filed Apr. 28, 2022, the contents of which are hereby incorporated by reference in their entirety.

BACKGROUND OF INVENTION

The current state of per-title encoding for live video streaming uses a fixed resolution-bitrate ladder to avoid additional encoding time complexity involved with finding optimum resolution-bitrate pairs for every video content. By contrast, in Video on Demand (VoD) applications, the same video content is encoded at various bitrates and spatial resolutions to find an optimal bitrate ladder for each video content.

HTTP Adaptive Streaming (HAS) continues to grow and has become the de facto standard in recent years for delivering video over the Internet. In HAS, each video is encoded at a set of bitrate-resolution pairs, referred to as a bitrate ladder. Traditionally a fixed bitrate ladder (e.g., HTTP Live Streaming (HLS) bitrate ladder) is used for all video content. To improve on this "one-size-fits-all" approach to account for the vast diversity in video content characteristics and network conditions, bitrate ladders can be optimized per title to increase the Quality of Experience (QoE).

Per-title encoding schemes are based on the premise that each resolution performs better than others in a specific region for a given bitrate range, and these regions depend on the video content. FIG. 1 shows a chart 100 of Rate-Distortion (RD) curves using video multi-method assessment fusion (VMAF) as the quality metric for a first video sequence and a second video sequence from prior art datasets, the RD curves resulting from encoding at 540$p$ (i.e., RD curves 104 and 108) and 1080p (i.e., RD curves 102 and 106) resolutions for the bitrates shown. As shown in chart 100, for the first video sequence, the cross-over bitrate between 540p and 1080p resolutions happens at approximately $b_1$=1.2 Mbps, which means at bitrates lower than $b_1$, 540$p$ resolution outperforms 1080p, while at bitrates higher than $b_1$, 1080 p resolution outperforms 540p. On the other hand, for the second video sequence, 1080p remains superior at the entire bitrate range, which manes 1080p should be selected for the bitrate ladder for the entire bitrate range. This content-dependency to select the optimal bitrate-resolution pairs is the basis for introducing per-title encoding. Each video segment is encoded at several quality levels in this scheme, and bitrate resolution pairs per each quality level and convex-hull is determined. The bitrate-resolution pair with the highest quality (i.e., closer to the convex-hull) is selected for each quality level. For example, bitrate-quality pairs are shown in FIG. 2 by dotted curves 202-212 for a third video sequence encoded at a set of bitrates and resolutions. In chart 200, the third video sequence has been encoded at a set of bitrates and resolutions to determine the convex-hull (e.g., outline around curves 202-212). For each requested bitrate, the resolution with bitrate-quality pair closer to the convex-hull is selected for the bitrate ladder.

Though per-title encoding enhances the quality of video delivery, determining convex-hull is computationally expensive, making it suitable for VoD streaming applications, but not for live video streaming. Some methods have been developed to pre-analyze video content to avoid a brute force encoding of all bitrate-resolution pairs. Content-gnostic methods employ machine learning to find a bitrate range for each resolution that outperforms other resolutions, and a Random Forest (RF) classifier can be used to decide which encoding resolution is best suited for different quality ranges and to study machine learning based adaptive resolution prediction. However, these approaches still yield latency much higher than the accepted latency for live streaming.

Therefore, a low-latency perceptually aware online per-title encoding is desirable for live video streaming.

BRIEF SUMMARY

The present disclosure provides techniques for perceptually aware online per-title encoding for live video streaming. A method for perceptually aware per-title encoding may include: receiving an input video, a set of resolutions, a maximum target bitrate and a minimum target bitrate; extracting two or more features for each of a plurality of segments of the input video, the two or more features comprising a spatial energy feature and an average temporal energy; predicting a perceptually aware bitrate-resolution pair for the each of the plurality of segments using a model, the perceptually aware bitrate-resolution pair being based on the spatial energy feature and the average temporal energy, the model being configured to optimize for a quality metric using constants trained for each resolution; generating a target encoding set comprising a set of perceptually aware bitrate-resolution pairs; and encoding the target encoding set.

In some examples, the set of perceptually aware bitrate-resolution pairs comprises fewer pairs than resolutions in the set of resolutions. In some examples, the set of perceptually aware bitrate-resolution pairs comprises fewer pairs than a number of bitrates from the maximum target bitrate to the minimum target bitrate. In some examples, the perceptually aware bitrate-resolution pair is predicted based on a just noticeable difference (JND) quality value. In some examples, the two or more features are extracted using a Discrete Cosine Transform (DCT)-energy function. In some examples, exponentially higher costs are assigned to higher DCT frequencies. In some examples, the two or more features comprise low-complexity features. In some examples, the average temporal energy is computed by comparing the blockwise sum of absolute differences (SAD) of the texture energy of each frame in a given segment of the plurality of segments to the blockwise SAD of a previous frame in the given segment. In some examples, the quality metric comprises video multi-method assessment fusion (VMAF). In some examples, the constants trained for each resolution are trained using a linear regression approach. In some examples, predicting the perceptually aware bitrate-resolution pair comprises implementing a machine learning model. In some examples, the encoding the target encoding set comprises online per-title encoding.

In some examples, the method also includes receiving as input one, or a combination, of a peak bitrate, a maximum buffer size, and a maximum segment length. In some examples, the method also includes scaling the encoded target encoding set for display.

BRIEF DESCRIPTION OF THE DRAWINGS

FIGS. 6A-6D are charts illustrating Rate-Distortion curves resulting from encoding video sequences using perceptually aware per-title encoding as compared with prior art methods.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for perceptually aware online per-title encoding.

In this invention, a low-latency perceptually aware online per-title encoding scheme that improves bitrate ladders for live video streaming applications without any noticeable additional latency. Content-aware features may comprise Discrete Cosine Transform (DCT)-energy-based low-complexity spatial and temporal features extracted to determine video segment characteristics. Based on said content-aware features, a low-complexity convex-hull prediction algorithm may be used to predict an optimum bitrate-resolution for each video segment based on a just noticeable difference (JND) in quality perception.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

Figure 1:
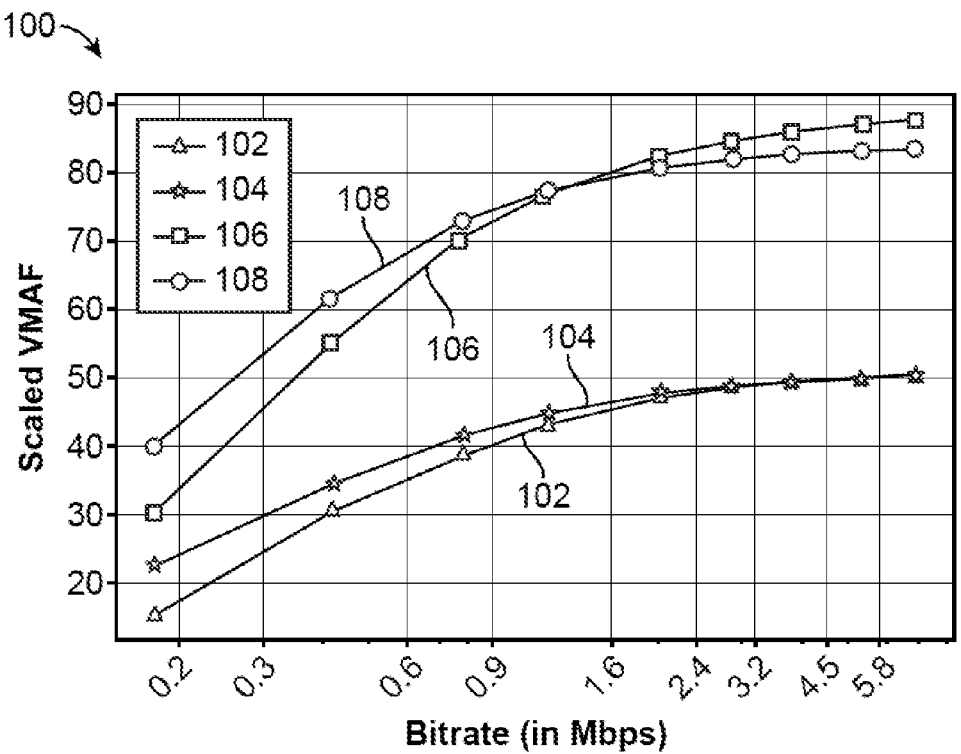
FIG. 1 is a chart illustrating exemplary Rate-Distortion curves resulting from encoding video sequences using prior art methods.
Figure 2:
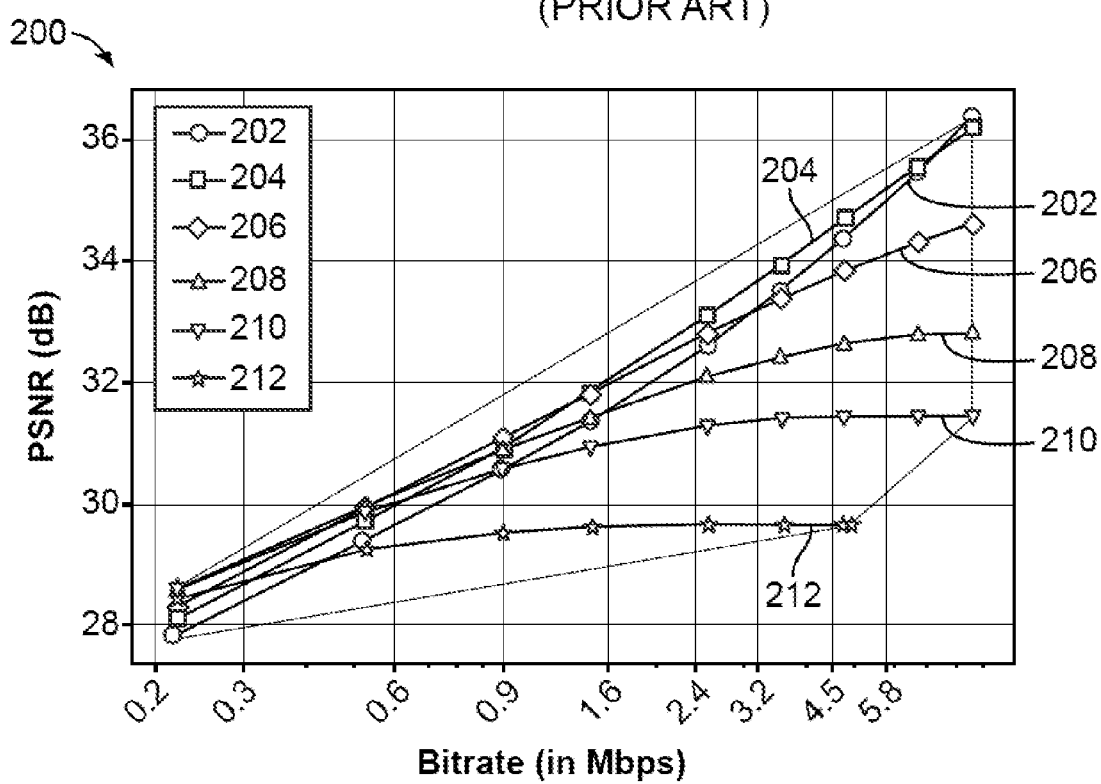
FIG. 2 is a chart illustrating Rate-Distortion curves resulting from encoding a video sequence at a set of bitrates and resolutions using prior art methods.
Figure 3:
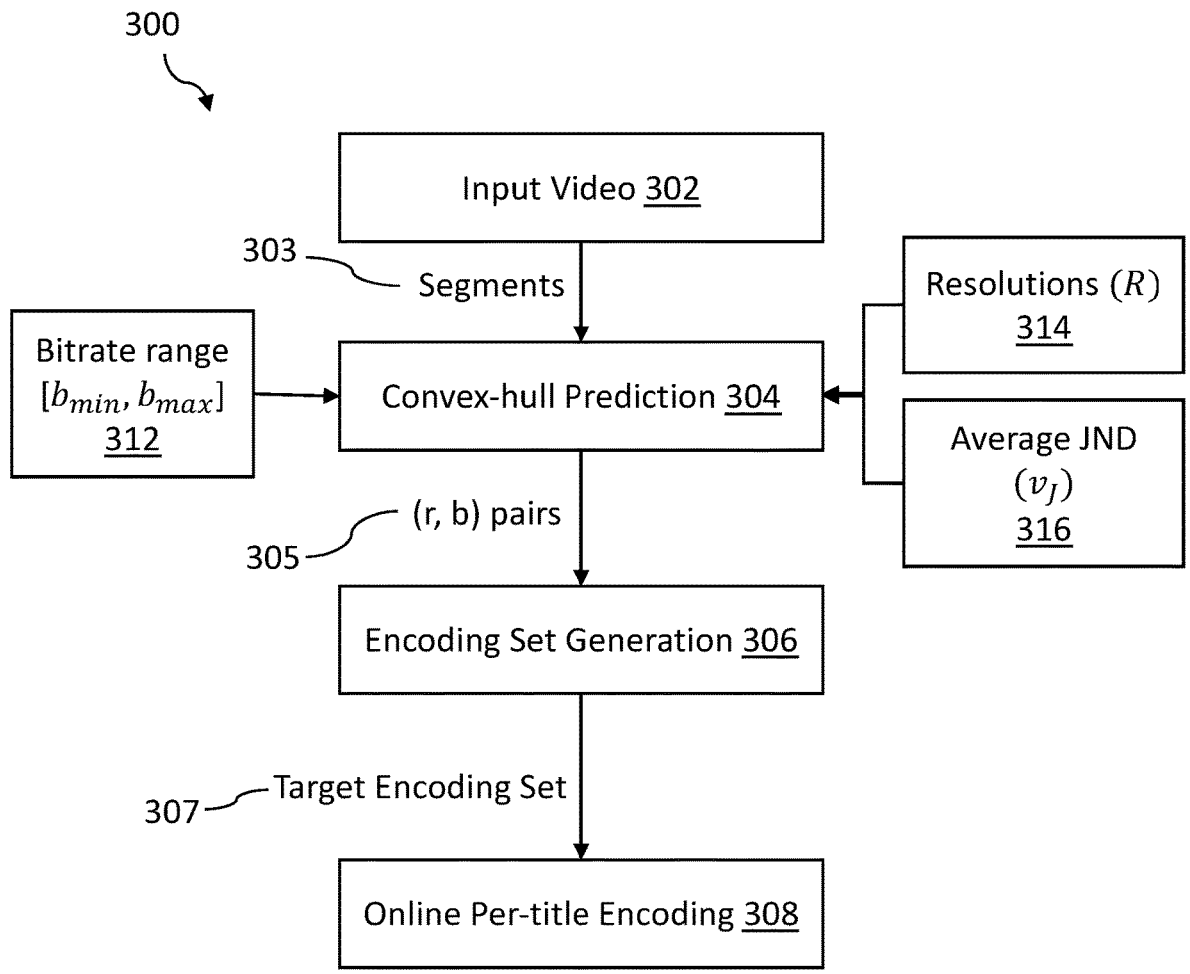
FIG. 3 is a simplified block diagram of an exemplary perceptually aware per-title encoding framework, in accordance with one or more embodiments.

FIG. 3 is a simplified block diagram of an exemplary perceptually aware per-title encoding framework, in accordance with one or more embodiments. Framework 300 includes input video 302, convex-hull prediction module 304, encoding set generation module 306, and online per-title encoding module 308. Input video 302 may be split into multiple segments 303. Convex-hull prediction module 304 may be configured to predict a convex-hull for each of segments 303 using spatial and temporal features of said each of segments 303. In some examples, convex-hull prediction module 304 also may predict the convex-hull for each of segments 303 using a set of pre-defined resolutions (R), maximum and minimum target bitrates ($b_{max}$ and $b_{min}$, respectively), and average JND quality ($v_j$) of the bitrate ladder. Target encoding set 307 may be generated by encoding set generation module 306 based on predicted bitrate-resolution (r, b) pairs 305. In some examples, encoding is carried out by online per-title encoding 308 on target encoding set 307, comprising the predicted bitrate-resolution pairs 305 for each segment, without the need to encode other or all bitrates and resolutions. For example, predicted bitrate-resolution pairs 305 comprise fewer pairs than there are resolutions in the set of resolutions and/or set of target bitrates (e.g., from maximum to minimum target bitrates). In some examples, convex-hull prediction module 304 may comprise, and may be configured to implement, a neural network or other machine learning (ML) model. In other examples, convex-hull prediction module 304 may be configured to implement a different (e.g., non-ML) model.

Convex-hull prediction module 304 may be configured to perform feature extraction and bitrate prediction. For live streaming applications, selecting low-complexity features is helpful to ensure low-latency video streaming without disruption. For a given video segment (e.g., one of segments 303), two or more features may be calculated, including an average texture energy and an average gradient of the texture energy. In an example, a DCT-based energy function may be used to determine the block-wise texture of each frame:

$$H_{p,k} = \sum_{i=0}^{w-1} \sum_{j=0}^{w-1} e \left| \left(\frac{ij}{w^2}\right)^2 - 1 \right| |DCT(i-1, j-1)|$$

Frame p has a block address k, and the block size is w×w pixels (e.g., 32×32 pixels, 64×64 pixels, or larger or smaller). In other examples, the block size may have a width w and a height/length $\lambda$, and the energy function may be a function of w×$\lambda$ instead of $w^2$. DCT(i,j) is the $(i,j)^{th}$ DCT component when i+j>0, and otherwise it is 0. Exponentially higher costs are assigned to higher DCT frequencies (e.g., caused by a mixture of objects). The texture is averaged to determine the spatial energy feature denoted as E:

$$E = \sum_{p=0}^{P-1} \sum_{k=0}^{C-1} \frac{H_{p,k}}{P*C*w^2}$$

In this function, C represents the number of blocks per frame, and P denotes a number of frames in the segment. The blockwise SAD (i.e., sum of absolute differences) of the texture energy of each frame compared to its previous frame may be computed and averaged for each frame of the video to obtain an average temporal energy h:

$$h = \sum_{p=1}^{P-1} \sum_{k=0}^{C-1} \frac{SAD(H_{p,k}, H_{p-1,k})}{(P-1)*C*w^2}$$

Convex-hull prediction module 304 also may be configured to predict a bitrate-resolution pair for each of segments 303 using the above-described extracted features. There is a significant correlation between VMAF and $$\log\left(\frac{h*b}{E}\right)$$

for every resolution (e.g., Pearson Correlation). Thus, VMAF for a resolution r and target bitrate b may be modelled as:

$$v_{r,p} = A_{0,r} \log\left(\sqrt{\frac{h}{E} * b_0^2}\right) + A_{1,r}$$

In this function, $A_{0,r}$ and $A_{1,r}$ are constants defined for each resolution r. Such constants may be trained using a linear regression approach. A target bitrate for each resolution r to achieve VMAF $v_t$ ($b_{r,v}$) may be determined by:

$$b_{r,v_t} = \sqrt{\sqrt{\frac{E}{h}} e\left(\frac{v_t - A_{1,r}}{A_{0,r}}\right)}$$

Once trained, a perceptually aware bitrate ladder for any video segment may be predicted using the input maximum and minimum target bitrates ($b_{max}$ and $b_{min}$, respectively), set of resolutions (R), average or target JND quality ($v_j$), and extracted E and h features, as shown in Algorithm 1 below.

---
Algorithm 1: Bitrate ladder prediction algorithm
---

Inputs:
  $b_{min}$, $b_{max}$: minimum and maximum target bitrate
  R: set of all resolutions r
  $v_j$: average (target) JND function
Output: (r, b) pairs of the bitrate ladder
Step 1: $b_0 = b_{min}$ $$v_{r,b_0} = A_{0,r} \log\left(\sqrt{\frac{h}{E}} \cdot b_0^2\right) + A_{1,r}$$

$v_0 = \max(v_{r,b_0})$
  $r_0 = \arg\max_{r \in R}(v_{r,b_0})$
  ($r_0$, $b_0$) is the first point of the bitrate ladder
Step 2:
  t = 1
  for t ≥ 1 do
  |   $v_t = v_{t-1} + v_j(v_{t-1})$
  |
  |   $b_{r,v_t} = \sqrt{\sqrt{\frac{E}{h}} e^{\left(\frac{v_t - A_{1,r}}{A_{0,r}}\right)}}$
  |
  |   $b_t = \min(b_{r,v_t})$
  |   $r_t = \arg\min_{r \in R}(b_{r,v_t})$
  |   if $b_t > b_{max}$ or $v_t > v_{max}$ then
  |   └ End of the algorithm
  |   else
  |   |   ($r_t$, $b_t$) is the (t + 1)$^{th}$ point of the bitrate
  |   |   ladder.
  |   └   t = t + 1
  └

Figure 4:
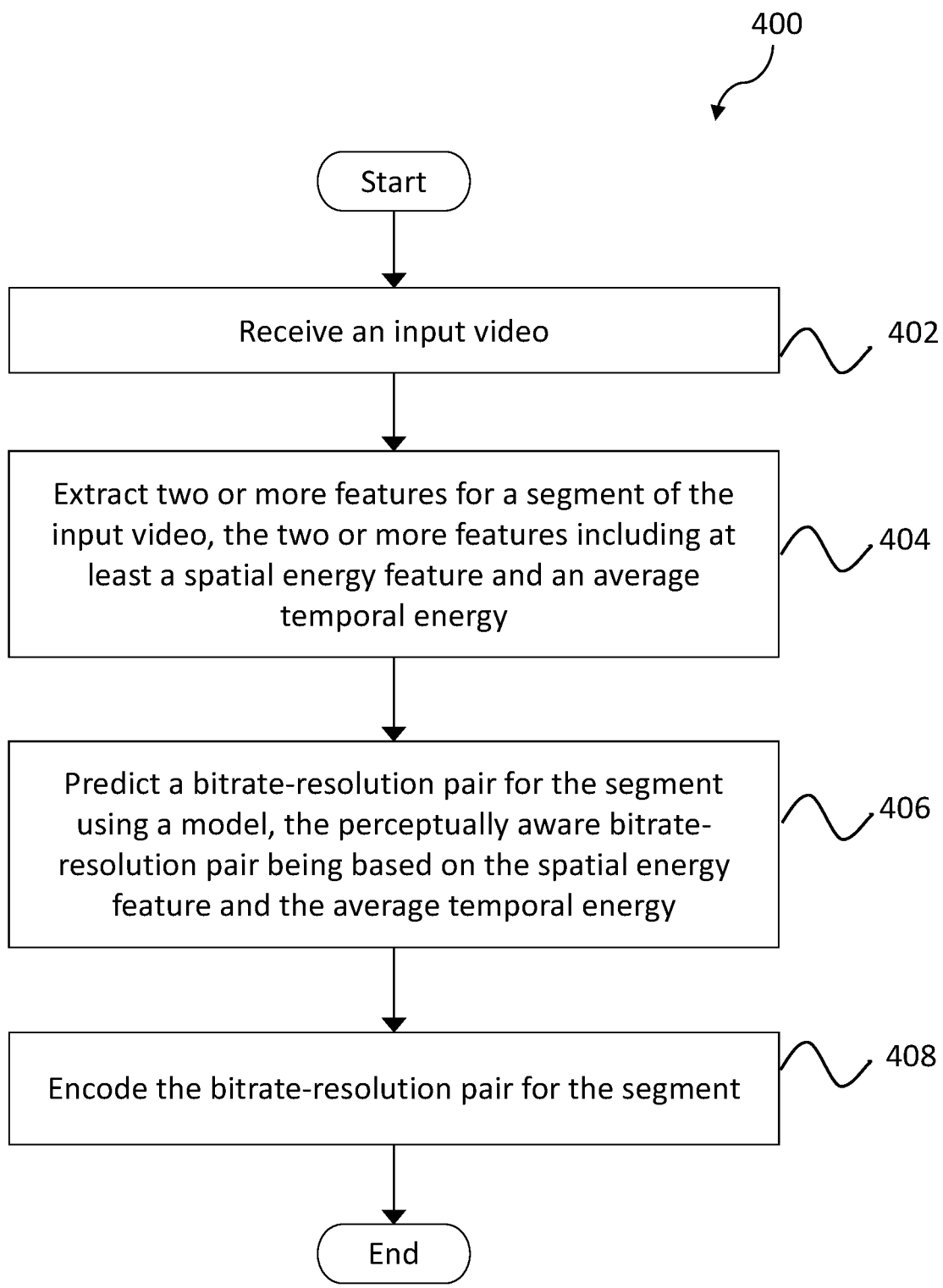
FIG. 4 is a flow chart illustrating an exemplary method for perceptually aware per-title encoding, in accordance with one or more embodiments.

FIG. 4 is a flow chart illustrating an exemplary method for perceptually aware per-title encoding, in accordance with one or more embodiments. Method 400 may begin with receiving an input video at step 402. In some examples, the input video may be split into a plurality of segments. In some examples, one or a combination of a set of resolutions, a maximum target bitrate and a minimum target bitrate also may be received. At step 404, two or more features may be extracted for a segment of the input video (e.g., one of the plurality of segments), the two or more features including at least a spatial energy feature and an average temporal energy. A bitrate-resolution pair for the segment may be predicted (e.g., by convex-hull prediction module 304) using a model at step 406, the bitrate-resolution pair being based on the spatial energy feature and the average temporal energy. In some examples, the model may be configured to optimize for a quality metric using constants trained for each resolution in the set of resolutions, as described herein. In some examples, a target encoding set may be generated (e.g., by encoding set generation module 306) comprising the bitrate resolution pair for the segment. The bitrate resolution pair for the segment, or the target encoding set comprising a set of bitrate-resolution pairs, may be encoded at step 408 (e.g., by online per-title encoding module 308). In an example, encodings may be generated using ×265 v3.5 (e.g., with a fast, faster, veryfast, superfast, or other encoding speed preset). In some examples, a video buffer model or mode may be implemented to ensure correct buffering of encoded video stream. In some examples, a peak bitrate may be predetermined (e.g., 110% or other peak bitrate given by a content provider) with a maximum buffer size set to a magnitude of the peak bitrate (e.g., 300% or other maximum buffer size given by a content provider), as well as a maximum segment length (e.g., one second, two seconds, several seconds, tens of seconds, or other suitable length). In some examples, encoded content may be scaled to a higher resolution for display.

Figure 5A:
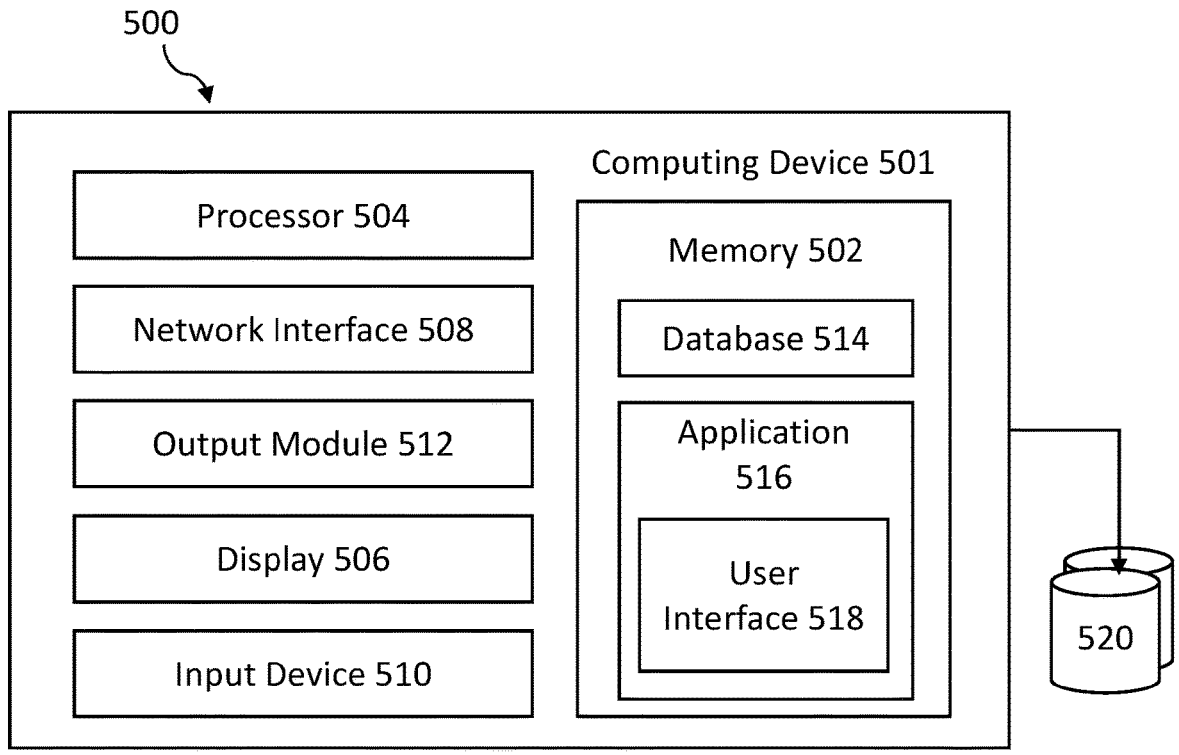
FIG. 5A is a simplified block diagram of an exemplary computing system configured to implement the framework illustrated in FIG. 3 and perform steps of the method illustrated in FIG. 4, in accordance with one or more embodiments.

FIG. 5A is a simplified block diagram of an exemplary computing system configured to implement the framework illustrated in FIG. 3 and perform steps of the method illustrated in FIG. 4, in accordance with one or more embodiments. In one embodiment, computing system 500 may include computing device 501 and storage system 520. Storage system 520 may comprise a plurality of repositories and/or other forms of data storage, and it also may be in communication with computing device 501. In another embodiment, storage system 520, which may comprise a plurality of repositories, may be housed in one or more of computing device 501. In some examples, storage system 520 may store networks, video data, bitrate ladders, bitrate-resolution pairs, target encoding sets, metadata, instructions, programs, and other various types of information as described herein. This information may be retrieved or otherwise accessed by one or more computing devices, such as computing device 501, in order to perform some or all of the features described herein. Storage system 520 may comprise any type of computer storage, such as a hard drive, memory card, ROM, RAM, DVD, CD-ROM, write-capable, and read-only memories. In addition, storage system 520 may include a distributed storage system where data is stored on a plurality of different storage devices, which may be physically located at the same or different geographic locations (e.g., in a distributed computing system such as system 550 in FIG. 5B). Storage system 520 may be networked to computing device 501 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 501, which in some examples may be included in mobile device 501 and in other examples may be included in a server (e.g., dual-processor server), also may include a memory 502. Memory 502 may comprise a storage system configured to store a database 514 and an application 516. Application 516 may include instructions which, when executed by a processor 504, cause computing device 501 to perform various steps and/or functions (e.g., implementing a convex-hull prediction algorithm and other aspects of a perceptually aware per-title encoding), as described herein. Application 516 further includes instructions for generating a user interface 518 (e.g., graphical user interface (GUI)). Database 514 may store various algorithms and/or data, including neural networks (e.g., convolutional neural networks) and data regarding bitrates, videos, video segments, bitrate-resolution pairs, target encoding sets, device characteristics, network performance, among other types of data. Memory 502 may include any non-transitory computer-readable storage medium for storing data and/or software that is executable by processor 504, and/or any other medium which may be used to store information that may be accessed by processor 504 to control the operation of computing device 501.

Computing device 501 may further include a display 506, a network interface 508, an input device 510, and/or an output module 512. Display 506 may be any display device by means of which computing device 501 may output and/or display data (e.g., to play decoded video). Network interface 508 may be configured to connect to a network using any of the wired and wireless short range communication protocols described above, as well as a cellular data network, a satellite network, free space optical network and/or the Internet. Input device 510 may be a mouse, keyboard, touch screen, voice interface, and/or any or other hand-held controller or device or interface by means of which a user may interact with computing device 501. Output module 512 may be a bus, port, and/or other interfaces by means of which computing device 501 may connect to and/or output data to other devices and/or peripherals.

In one embodiment, computing device 501 is a data center or other control facility (e.g., configured to run a distributed computing system as described herein), and may communicate with a media playback device. As described herein, system 500, and particularly computing device 501, may be used for video playback, running an application, encoding and decoding video data, providing feedback to a server, and otherwise implementing steps in a perceptually aware per-title encoding method, as described herein. Various configurations of system 500 are envisioned, and various steps and/or functions of the processes described below may be shared among the various devices of system 500 or may be assigned to specific devices.

Figure 5B:
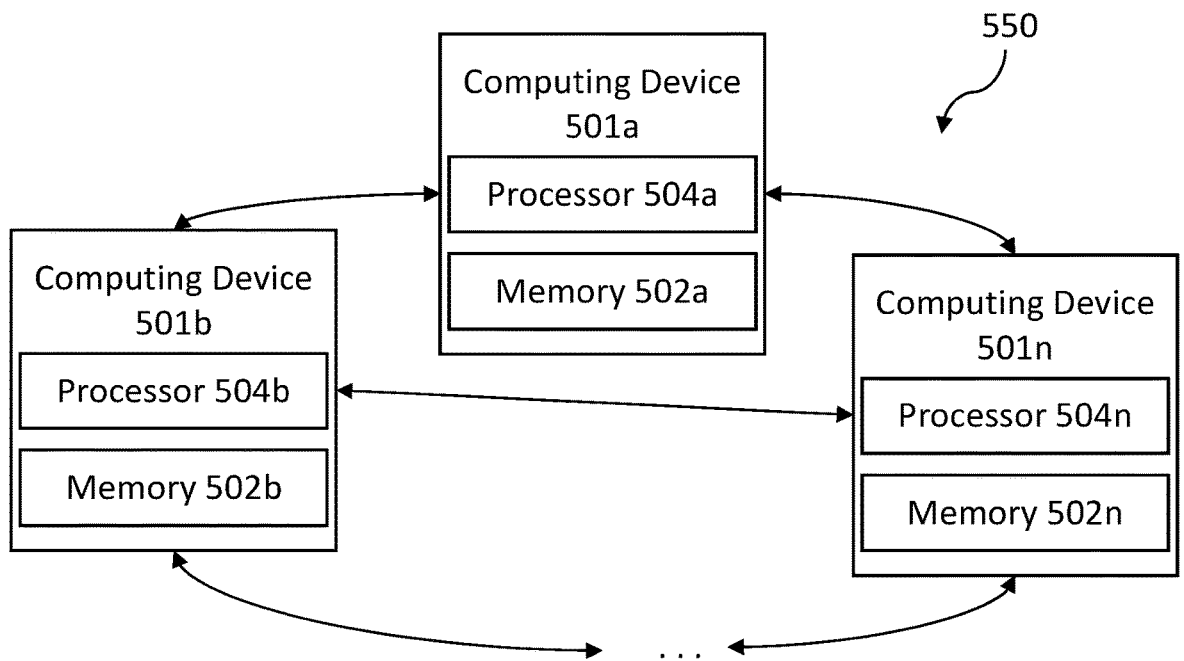
FIG. 5B is a simplified block diagram of an exemplary distributed computing system implemented by a plurality of computing devices, in accordance with one or more embodiments.

FIG. 5B is a simplified block diagram of an exemplary distributed computing system implemented by a plurality of computing devices, in accordance with one or more embodiments. System 550 may comprise two or more computing devices 501a-n. In some examples, each of 501a-n may comprise one or more of processors 504a-n, respectively, and one or more of memory 502a-n, respectively. Processors 504a-n may function similarly to processor 504 in FIG. 5A, as described above. Memory 502a-n may function similarly to memory 502 in FIG. 5A, as described above.

FIGS. 6A-6D are charts illustrating Rate-Distortion (RD) curves resulting from encoding video sequences using perceptually aware per-title encoding as compared with prior art methods. In FIG. 6A, results curve 604 show that encodings of a first video sequence using a perceptually aware per-title encoding method, as described herein, yield the same or better (e.g., higher) VMAF as compared to results curve 602 using a prior art encoding scheme (e.g., HLS ladder). Similarly, results curves 614, 624, and 634 show that encodings of a second, third, and fourth video sequences, respectively, yield the same or better VMAF as compared to results curves 612, 622, and 632 using a prior art encoding scheme. The average difference between VMAFs of consecutive RD points along curves 604, 614, 624, and 634 indicates the input (i.e., target) JND values for those video sequences, respectively.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for perceptually aware per-title encoding, the method comprising:
   receiving an input video, a set of resolutions, a maximum target bitrate and a minimum target bitrate;
   extracting two or more features for each of a plurality of segments of the input video, the two or more features comprising a spatial energy feature and an average temporal energy;
   predicting a perceptually aware bitrate-resolution pair for the each of the plurality of segments using a model, the perceptually aware bitrate-resolution pair being based on the spatial energy feature and the average temporal energy, the model being configured to optimize for a quality metric using constants trained for each resolution in the set of resolutions;
   generating a target encoding set comprising a set of perceptually aware bitrate-resolution pairs; and
   encoding the target encoding set.

2. The method of claim 1, wherein the set of perceptually aware bitrate-resolution pairs comprises fewer pairs than a number of resolutions in the set of resolutions.

3. The method of claim 1, wherein the set of perceptually aware bitrate-resolution pairs comprises fewer pairs than a number of bitrates from the maximum target bitrate to the minimum target bitrate.

4. The method of claim 1, wherein the perceptually aware bitrate-resolution pair is predicted based on a just noticeable difference (JND) quality value.

5. The method of claim 1, wherein the two or more features are extracted using a Discrete Cosine Transform (DCT)-energy function.

6. The method of claim 5, wherein exponentially higher costs are assigned to higher DCT frequencies.

7. The method of claim 1, wherein the two or more features comprise low-complexity features.

8. The method of claim 1, wherein the average temporal energy is computed by comparing the blockwise sum of absolute differences (SAD) of the texture energy of each frame in a given segment of the plurality of segments to the blockwise SAD of a previous frame in the given segment.

9. The method of claim 1, wherein the quality metric comprises video multi-method assessment fusion (VMAF).

10. The method of claim 1, wherein the constants trained for each resolution are trained using a linear regression approach.

11. The method of claim 1, wherein predicting the perceptually aware bitrate-resolution pair comprises implementing a machine learning model.

12. The method of claim 1, wherein the encoding the target encoding set comprises online per-title encoding.

13. The method of claim 1, further comprising receiving as input one, or a combination, of a peak bitrate, a maximum buffer size, and a maximum segment length.

14. The method of claim 1, further comprising scaling the encoded target encoding set for display.

\* \* \* \* \*